(No Model.)
B. A. PROVOOST.
FISHING HOOK.
No. 440,721. Patented Nov. 18, 1890.
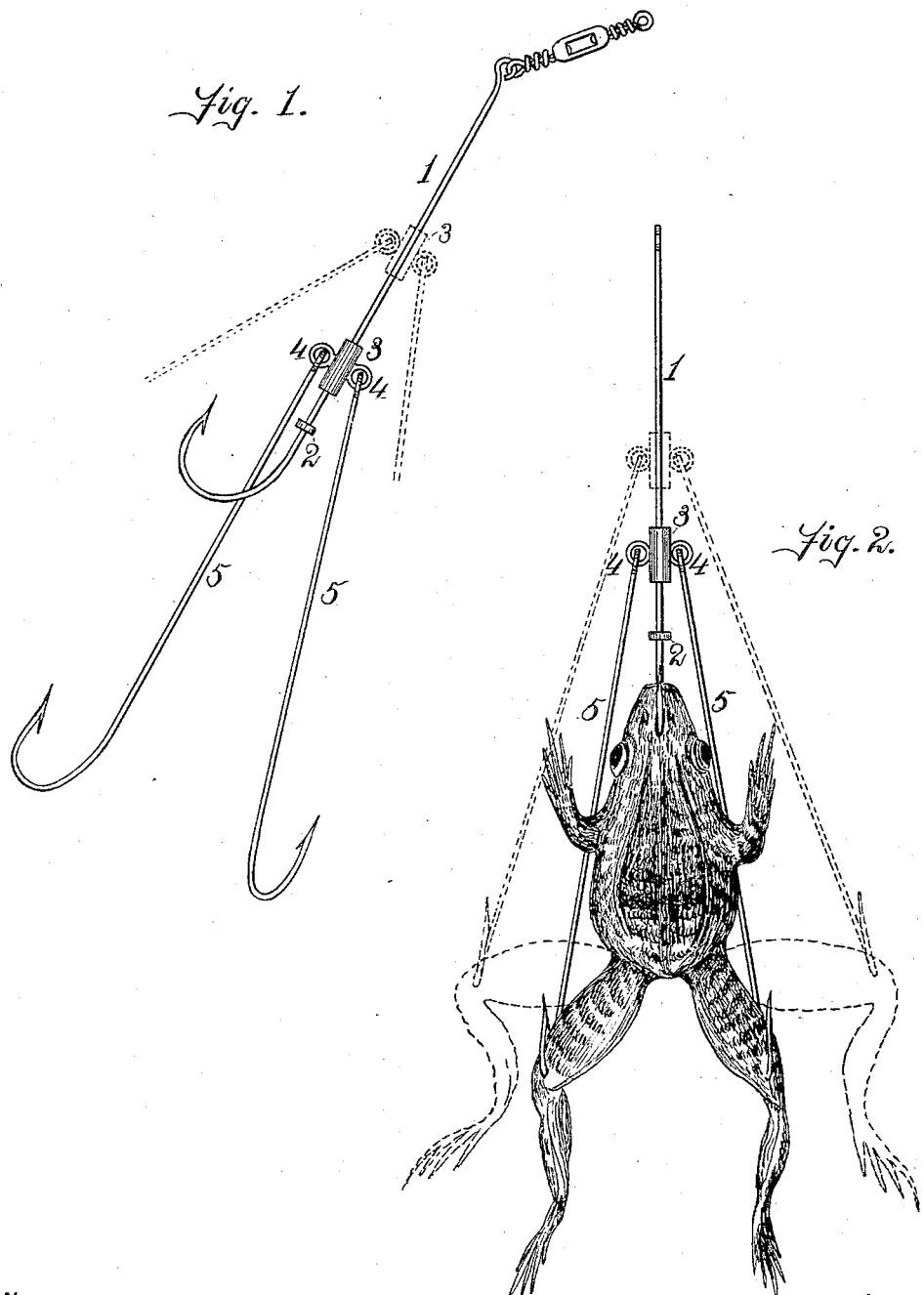

UNITED STATES PATENT OFFICE.

BENJAMIN A. PROVOOST, OF ST. PAUL, MINNESOTA.

FISHING-HOOK.

SPECIFICATION forming part of Letters Patent No. 440,721, dated November 18, 1890.

Application filed March 7, 1890. Serial No. 342,987. (No model.)

*To all whom it may concern:*

Be it known that I, BENJAMIN A. PROVOOST, a citizen of the United States, residing at St. Paul, in the county of Ramsey and State of Minnesota, have invented certain new and useful Improvements in Fishing-Hooks; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in fishing-hooks; and it consists in the combination of three hooks in such a manner as to move freely with reference to each other, as hereinafter described.

The object of my invention is to increase the efficiency of the hook and economize in the use of bait by retaining the bait in proper position with reference to the hooks by securing the bait in such a manner that it is not liable to be torn off or injured, and by so locating the several hooks that the bait cannot be seized without at the same time seizing the point of one of the hooks.

The invention is illustrated in the accompanying drawings, in which Figure 1 is a view of my improved device, showing the manner in which the several hooks are connected; and Fig. 2, a view showing the method of using.

In the drawings, 1 designates the fish-hook of ordinary form, attached to the line in the usual manner. Upon the shank of the hook 1, at about the point where the curvature begins, is secured a collar or stop 2, and between this stop and the eye of the shank is mounted a sleeve 3, sliding and turning loosely on the shank, its movement being limited only by the stop and eye before mentioned. Upon opposite sides of this sleeve 3 are formed loops or eyes 4 4, into which are secured the eyes of two other hooks 5 5. These latter hooks are preferably right and left hooks—that is, the point of each is turned outwardly from the plane in which the body of the hook lies—while the hook 1 is preferably straight—that is, its body and point lie in the same plane.

The method of using is clearly shown in Fig. 2, the invention being especially adapted for use with frog-bait. The hook 1 is inserted in or near the mouth of the frog, and the hooks 5 5 into the legs. By reason of the sliding and turning connection of the hooks 5 5 with the hook 1 the former are free to move in any direction with reference to the latter within the limits of the eye and the stop 2. The bait is thus allowed a certain freedom of movement, as shown by the dotted lines in Fig. 2, thus realizing all the advantages to be derived from the use of live bait. The bait is, moreover, supported by the shanks of the hooks 5 5 so as to lie normally in a horizontal position.

The great difficulty commonly encountered in the use of frog-bait arises from the fact that the legs of the bait are most liable to be seized by the fish, and in the struggle to land are often torn off, allowing the fish to escape and impairing the value of the bait for further use. In the use of the device herein described it will be readily seen that it is next to impossible for the fish to seize either of the legs of the bait without at the same time seizing and being caught by one or other of the hooks 5 5.

The free connection between the hooks 5 5 and the hook 1 allows of free movement of the bait in any direction, and also admits of different sizes of bait being used with equal efficiency. The stop 2 so connects the several hooks that the side hooks 5 5 are drawn in with the line, and a catch made by either of the same is handled with the same ease as if caught by the hook 1.

In practice it has been found convenient to make the shanks of the hook a little longer, with respect to the size of the hook proper, than in the ordinary construction, as shown in the drawings. This feature may be varied, however, according to requirement without departing from the principle of my invention, and any size or style of hooks may be used to suit various purposes.

I claim as my invention—

1. The combination, with a fishing-hook of ordinary form, of a sleeve mounted upon the shank thereof and adapted to turn and slide thereon between the eye and the curved portion thereof, eyes formed upon the opposite sides of said sleeve, and similar hooks having their eyes interlocked with said sleeve-eyes, whereby the bait may be supported at different points by the several hooks and still be allowed freedom of movement.

2. The combination, with a fishing-hook of ordinary form having a collar or stop upon its shank at a distance from the eye thereof, of a sleeve mounted upon said shank and adapted to turn and slide thereupon between the said eye and stop, eyes upon opposite sides of said sleeve, and similar hooks having eyes interlocked with said sleeve-eyes, substantially as and for the purpose herein specified.

3. The combination of two fish-hooks of ordinary form connected by means of eyes formed upon opposite sides of a sleeve with which eyes the eyes of the hooks are interlocked, and a third hook to which the line is secured carrying said sleeve loosely upon its shank, substantially as and for the purpose specified.

4. The combination, in a fishing device, of three hooks of ordinary form, the one of said hooks to which the line is attached and which is adapted to support one extremity of the bait carrying upon its shank a sleeve adapted to slide and turn freely thereupon between the eye and curved portion thereof, eyes upon opposite sides of said sleeve, and the other two hooks adapted to support other extremities of the bait having their eyes interlocked with said sleeve-eyes, substantially as specified, whereby the distance of the points of the side hooks from that of the middle hook may vary according to the size and movement of the bait.

5. The combination, in a fishing device, of three hooks of ordinary form connected by means of a sleeve carried upon the shank of one of the hooks to which hook the line is attached, and free to turn and slide thereupon between the eye and the curved portion thereof, the said sleeve having eyes upon opposite sides with which the eyes of the other two hooks are interlocked, substantially as specified, whereby three points variable in distance apart and relative positions are provided for the support of the bait and for catching purposes.

6. The combination, in a fishing device, of a hook to which the line is attached, a sleeve carried by the shank of said hook and free to turn and slide thereupon between the eye and the curved portion of the same, and an eye upon said sleeve with which the eye of another hook of ordinary form is interlocked, substantially as specified, whereby points variable in distance apart and in relative position are provided for the support of the bait and for catching purposes.

In testimony whereof I affix my signature in presence of two witnesses.

BENJ. A. PROVOOST.

Witnesses:
P. S. HENDRICKSON,
E. E. STARKEY.